Figure 1:
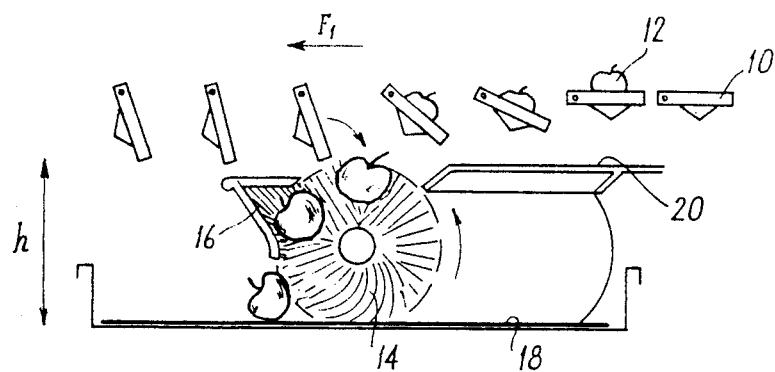

United States Patent [19]

Blanc

[11] Patent Number: 4,836,355

[45] Date of Patent: Jun. 6, 1989

[54] DEVICE FOR TRANSFER OF FRAGILE OBJECTS FROM A CONVEYOR TO A TRANSPORTER

[75] Inventor: Philippe Blanc, Montauban, France

[73] Assignee: Societe Montalbanaise de Constructions/Mecaniques, Montauban, France

[21] Appl. No.: 175,378

[22] Filed: Mar. 30, 1988

[51] Int. Cl.⁴ ...................... B65G 47/54; B65G 47/74
[52] U.S. Cl. ................................ 198/418.6; 198/534; 198/432
[58] Field of Search ............... 198/525, 526, 534, 424, 198/432, 723, 706, 479.1, 347

[56] References Cited

U.S. PATENT DOCUMENTS 3,272,309  9/1966  Reading .............................. 198/723
4,519,494  5/1985  McEvoy et al. ..................... 198/432

FOREIGN PATENT DOCUMENTS 2418758  9/1979  France .............................. 198/723
2171527  8/1986  United Kingdom .

Primary Examiner—Andres Kashnikow
Assistant Examiner—Christopher G. Trainor
Attorney, Agent, or Firm—Pollock, VandeSande & Priddy

[57] ABSTRACT

Fragile objects such as items of fruit are transferred from a receptacle conveyor to a transport belt by a rotary brush transverse to the conveyor and having bristles allowing formation of a cavity in the brush to receive the object when it falls from its receptacle, and a fixed brush facing the rotary brush to hold the object in its cavity until the object is deposited, without horizontal velocity, on the transport belt.

5 Claims, 1 Drawing Sheet

U.S. Patent
Jun. 6, 1989
4,836,355

DEVICE FOR TRANSFER OF FRAGILE OBJECTS FROM A CONVEYOR TO A TRANSPORTER

The present invention relates to a device for transferring fragile objects such as fruit between a conveyor provided with receptacles and a transporting belt passing below the conveyor.

There are known devices for weighing fragile objects such as fruit in which the items of fruit are transported by means of a conveyor provided with a plurality of receptacles in which the items of fruit are placed individually. After weighing, each item of fruit has to be transferred onto a transporting belt which passes below the level of the receptacles of this conveyor. Items of fruit being fragile objects, it is necessary to provide transfer systems avoiding any damage to the fruit. The difficulty encountered in devising these transfer systems resides in that the separation between the transporting belt and the level of the receptacles (distance h in FIG. 1 of the accompanying drawings) has to be greater than the largest dimension of the objects to be transferred. In transfer systems in current use, there is used an inclined plane on which the objects such as items of fruit, to be transferred roll between the level of the receptacles and the transporting belt. When the objects, because of their shape, do not easily roll, the slope of the inclined plane has to be large. This system has the disadvantage that the object is subjected to an initial fall during its passage from the receptacle to the inclined plane followed by several collisions between the rolling objects on the inclined plane and those which are already situated on the transporting belt. These known solutions thus risk damage to the objects transferred when the latter are fragile, as in the case with fruit.

The present invention is intended to provide a solution to this problem.

The present invention has as its subject a device for transfer of fragile objects, such as items of fruit, from the receptacles of a receptacle conveyor and a transport belt passing below the level of the receptacles of said conveyor brush arranged transversely to said receptacle conveyor, of which the length of the bristles is determined so as to provide a cavity receiving the object to be transferred when the latter fall from the corresponding receptacle, a brush, arranged facing the rotatable brush contributing to holding the object in its cavity in the rotatable brush until the object is deposited without horizontal speed onto the transport belt.

The speed of rotation of said rotatable brush may be related to that of the receptacle conveyor so as to sufficiently provide a free location in the rotatable brush for the following object.

The axis of the rotatable brush may be arranged transversely to the axis of the transport belt receiving the objects transferred in such a manner as to ensure a regular distribution of these objects over the whole width of this belt.

Figure 2:
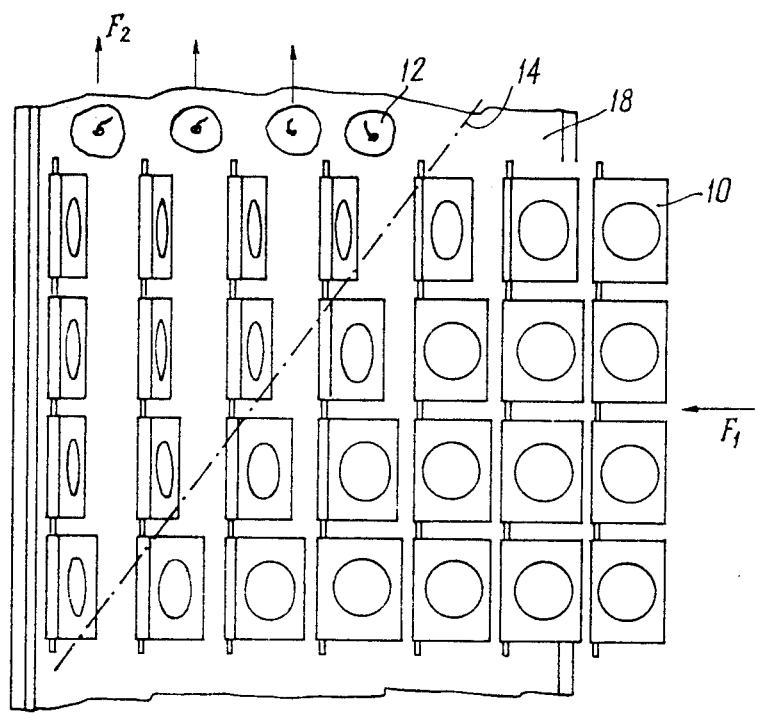

Other characteristics and advantages of this invention will appear from the description given below with reference to the accompanying drawing which illustrates an embodiment which does not have any limiting character. In the drawing:

FIG. 1 is a schematic view in lateral elevation of an embodiment of a transfer device according to the present invention applied to the transfer of fruit, and FIG. 2 is a plan view of FIG. 1.

Referring to the drawings, the transfer device has the function of transferring without damage fragile objects such as items of fruit 12 from receptacles 10 of a conveyor onto a transporting belt 18 passing below the level of the conveyor of receptacles. Regarding the construction of the receptacle conveyor, reference may be made to British patent application No. 2171527A of Philippe BLANC. The receptacles or cups are designed in such a way as to tilt when the fruit arrives in the transfer position, the cup conveyor being displaced in the direction of arrow F1.

According to the invention, transfer of the objects 12 is carried out by means of a cylindrical rotating brush 14 of which the axis is arranged transversely to that of the cup conveyor and of which the length of the bristles is determined so as to form a cavity receiving the object to be transferred when the latter falls from the corresponding receptacle 10 into the bristles of brush 14. A stationary brush 16 is arranged facing the brush 14, so as to hold the object 12 in its cavity in the rotatable brush so that it is not liberated until this object is deposited without horizontal speed onto the transport belt 18. The trajectory along arrow F2 of this transporting belt releases the fruit transferred from the bristles of brush 14.

The axis of brush 14 may be placed obliquely relative to that of the transport belt 18. In FIG. 2, the axis of the brush 14 has been shown in broken lines. However, the axis of transport belt 18 is not necessarily perpendicular to that of the receptacles 10.

To avoid the fruit 12 falling behind the brush 14, there is arranged in front of the latter a horizontal plate 20.

It will be understood that by choosing a tilting sequence for the receptacles 10 in relation to the inclination of the axis of brush 14 relative to the direction of the conveyor, it is possible to completely fill the transporting belt without producing collision or the rubbing together of the objects transferred. Of course the transfer device according to the invention allows the transporting belt 18 to be filled over its whole width.

It will appear from the description given above that the device which is the subject of this invention allows carrying out of practical transfer of fragile objects without damaging them, while ensuring a regular distribution of these objects over the whole width of the transport belt which receives them, which facilitates later operations of the grading of the objects and/or filling of subsequent receptacles with the objects.

What I claim is:

1. A device for transferring fragile objects from a receptacle conveyor to a transport belt, the device comprising:

a rotatable brush located transversely of the conveyor and including bristles having sufficient length and required stiffness to form protective cavities for objects delivered from the conveyor to the brush, each cavity being deep enough to receive an entire object and prevent its touching another object being transferred; and a stationary brush confronting a section of the rotatable brush for retaining an object in its respective protective cavity until the object contacts the transport belt with virtually zero initial horizontal velocity.

2. The structure set forth in claim 1 wherein the brush is cylindrical and has an axis maintained transversely relative to the length of the transport belt to allow transporting of objects across the entire width of the belt.

3. The structure set forth in claim 1 together with means located between the receptacle conveyor and the rotatable brush for preventing the object from back rolling off the rotatable brush.

4. The structure set forth in claim 3 wherein the rotatable brush is cylindrical and has an axis maintained transversely relative to the length of the transport belt to allow transporting of objects across the entire width of the belt.

5. A device for handling fragile objects, the device comprising:
- a plurality of transfer means for individually containing respective objects;
- a rotatable brush located transversely of the transfer means and including bristles having sufficient length and required stiffness to form protective cavities for objects delivered from the transfer means to the brush, each cavity being deep enough to receive an entire object and prevent its touching another object being handled;
- a stationary brush confronting a section of the rotatable brush for retaining an object in its respective protective cavity until the object contacts a transport belt with virtually zero initial horizontal velocity;
- means located between the transfer means and the rotatable brush for preventing the object from back rolling off the rotatable brush;
- wherein the rotatable brush is cylindrical and has an axis maintained transversely relative to the length of the transport belt to allow transporting of objects across the entire width of the belt.

* * * * *